(12) United States Patent
Plache et al.

(10) Patent No.: US 9,086,696 B2
(45) Date of Patent: Jul. 21, 2015

(54) SELF-ARBITRATED RESOURCES FOR INDUSTRIAL CONTROL SYSTEMS

(75) Inventors: Kenneth S. Plache, Scottsdale, AZ (US); Robert Kline, Phoenix, AZ (US); Paul R. D'mura, Glendale, AZ (US); Gretchen Lee Krehbiel, Phoenix, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 911 days.

(21) Appl. No.: 12/241,109

(22) Filed: Sep. 30, 2008

(65) Prior Publication Data

US 2010/0082814 A1    Apr. 1, 2010

(51) Int. Cl.
  *G05B 19/418*  (2006.01)
  *H04L 29/08*  (2006.01)
(52) U.S. Cl.
  CPC ............ *G05B 19/4185* (2013.01); *H04L 67/12* (2013.01); *H04L 67/322* (2013.01); *G05B 2219/2222* (2013.01); *G05B 2219/32328* (2013.01)

(58) Field of Classification Search
  USPC ............................. 709/226; 700/99–104, 112
  See application file for complete search history.

(56) References Cited

U.S. PATENT DOCUMENTS

| | | | |
|---|---|---|---|
| 5,369,570 A * | 11/1994 | Parad | 705/8 |
| 6,848,015 B2 * | 1/2005 | Jones | 710/311 |
| 7,043,320 B1 * | 5/2006 | Roumeliotis et al. | 700/100 |
| 7,277,952 B2 * | 10/2007 | Nishanov et al. | 709/229 |
| 7,284,244 B1 * | 10/2007 | Sankaranarayan et al. | 718/104 |
| 7,463,939 B1 * | 12/2008 | Mata et al. | 700/100 |
| 2004/0204772 A1 * | 10/2004 | Maturana et al. | 700/2 |
| 2006/0089739 A1 * | 4/2006 | Sherriff et al. | 700/99 |
| 2007/0112723 A1 * | 5/2007 | Alvarez et al. | 707/2 |

* cited by examiner

*Primary Examiner* — Mohammad Ali
*Assistant Examiner* — Nathan Laughlin
(74) *Attorney, Agent, or Firm* — Amin, Turocy & Watson, LLP

(57) ABSTRACT

An industrial control system is provided. The system includes two or more industrial control resources that are employed to operate a control process. This includes at least one arbitration component installed with each of the industrial control resources, where the arbitration component is employed to resolve priorities between the industrial control resources.

19 Claims, 9 Drawing Sheets

SELF-ARBITRATED RESOURCES FOR INDUSTRIAL CONTROL SYSTEMS

TECHNICAL FIELD

The claimed subject matter relates generally to industrial control systems and more particularly to arbitration components that allow industrial resources to determine availability, privileges and priority while offloading arbitration responsibilities from higher-level controls.

BACKGROUND

Industrial controllers are special-purpose computers utilized for controlling industrial processes, manufacturing equipment, and other factory automation, such as data collection or networked systems. Controllers often work in concert with other computer systems to form an environment whereby a majority of modern and automated manufacturing operations occur. These operations involve front-end processing of materials such as steel production to more intricate manufacturing processes such as automobile production that involves assembly of previously processed materials. Often such as in the case of automobiles, complex assemblies can be manufactured with high technology robotics assisting the industrial control process.

In many automated processes, including the basic production of commodities such as food, beverages, and pharmaceuticals, complex state logic is often designed and programmed by Systems Engineers or provided in some cases by automated equipment manufacturers. This logic is often programmed with common PLC ladder logic or higher level languages supported by Sequential Function Charts. Sequence logic can be employed for a plurality of tasks such as material movement and conveying operations, packaging operations, or as part of an assembly process itself, wherein various stages of an assembly are sequenced from stage to stage until a final assembly occurs. As can be appreciated, much planning and design is required to implement an automated production process that can involve hundreds of machines, computers, and program logic to facilitate proper operation of the respective sequences.

In some batch systems for automating production processes, current batch products can aggregate Units for production into Unit Classes, where a Unit Class defines the global common functionality of all Units that are members of the Unit Class. This allows for the construction of "class-based" recipes, built against a Unit Class or Classes. When building a class based recipe, a recipe author is generally limited to referencing only the functionality common to all instances of the Unit Class. This generally results in the class based recipe being able to run against all instances of the Unit Class. The "common functionality" that can be referenced across all members of a Unit Class by class based recipes are Recipe Phases and Unit Tag Classes. However, variations in the properties (attributes) of the individual reactors are great enough that the set of properties (attributes) that are common to all instances of the class are limited. Recipe Phases can be employed as "steps" inside of Unit Operation Sequential Function Charts (SFCs), for example. Unit Tag Classes can be referenced by Transition Expressions on Transitions inside of class based Unit Procedure and Unit Operation SFCs.

One challenge facing industrial processing systems is related to how equipment resources are selected, acquired and prioritized for use given a set of competing resources that can be employed for a given operation. Presently, high-end controllers need to analyze resources available, communicate with the resources, and determine which resource should be selected based upon an arbitration routine. Such overhead and monitoring requires programming resources to be expended on the controller while lowering the overall performance of the controller. In extreme cases, a dedicated server may be employed to arbitrate priorities among resources. As can be appreciated, utilizing additional hardware and software can add considerable cost to a given control solution.

SUMMARY OF THE INVENTION

The following summary presents a simplified overview to provide a basic understanding of certain aspects described herein. This summary is not an extensive overview nor is it intended to identify critical elements or delineate the scope of the aspects described herein. The sole purpose of this summary is to present some features in a simplified form as a prelude to a more detailed description presented later.

Arbitration functionality is offloaded from higher-level controls to lower-level devices that have intelligence to arbitrate amongst the devices. Distributed processing can be utilized between the devices to determine a relative priority among a set of devices, where arbitration is sometimes referred to as resource allocation. Thus, in one aspect, resource allocation is distributed among devices that are self-arbitrated between members of a group (e.g., deciding which device is available, determining relevant priorities between devices, queuing arbitration requests, selecting one or more devices for execution without having main controller involved in the device execution and distribution). Status between devices can be shared across a network or can be coupled via I/O signals to determine priorities. Resources of the plant floor (e.g., equipment, pumps, valves, units, production lines) are enabled to be self-aware of their respective status for being in use or available for use. This allows the resources to arbitrate between each other as opposed to having a central server or service administering ownership of equipment. By offloading resource arbitration responsibilities from centralized controllers or servers, system performance can be enhanced while mitigating system costs.

To the accomplishment of the foregoing and related ends, the following description and annexed drawings set forth in detail certain illustrative aspects. These aspects are indicative of but a few of the various ways in which the principles described herein may be employed. Other advantages and novel features may become apparent from the following detailed description when considered in conjunction with the drawings.

DETAILED DESCRIPTION OF THE INVENTION

An industrial control system includes arbitration components that facilitate resource allocation among automation components. In one aspect, an industrial control system is provided. The system includes two or more industrial control resources that are employed to operate a control process. This includes at least one arbitration component installed with each of the industrial control resources, where the arbitration component is employed to resolve priorities between the industrial control resources.

It is noted that as used in this application, terms such as "component," "module," "attribute," "resource," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process or thread of execution and a component may be localized on one computer or distributed between two or more computers, industrial controllers, or modules communicating therewith.

Figure 1:
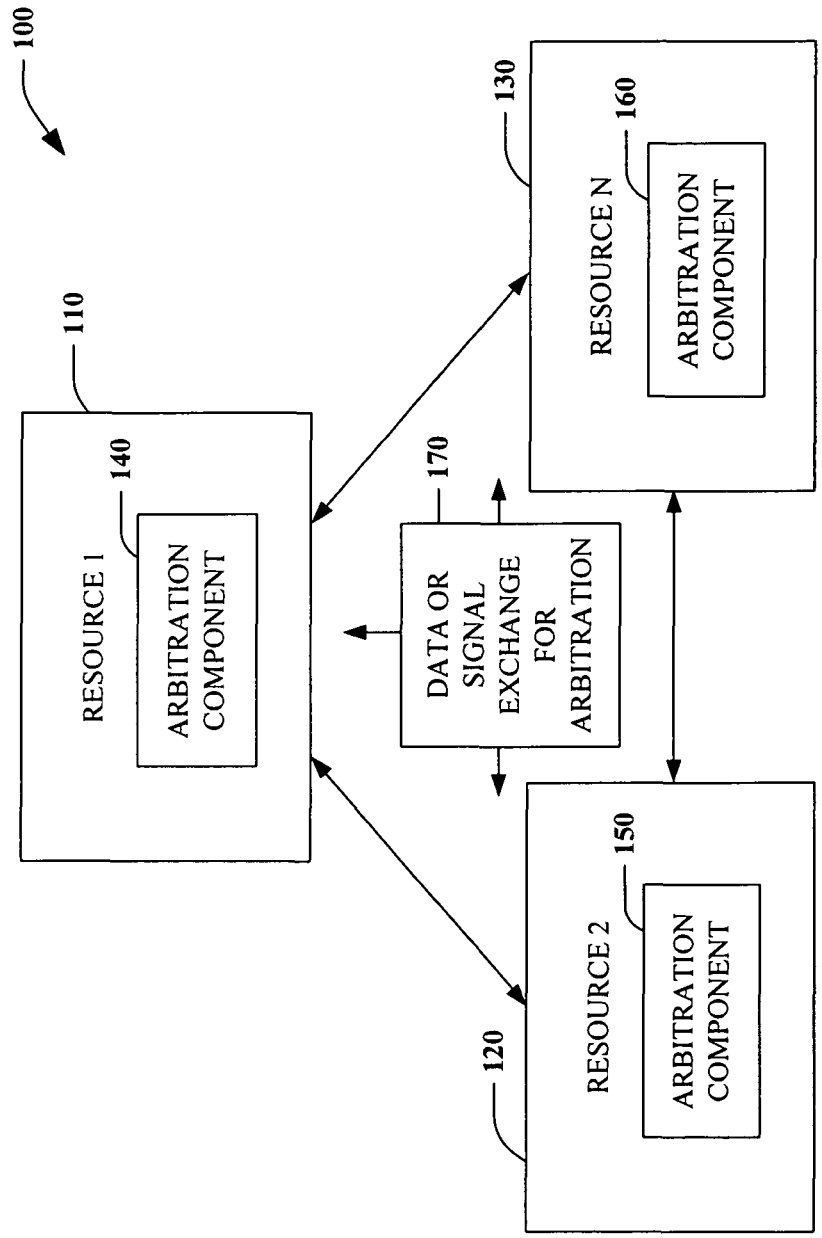
FIG. 1 is a schematic block diagram illustrating arbitration components that facilitate resource allocation among automation components.

Referring initially to FIG. 1, a system 100 illustrates arbitration components that facilitate resource allocation among various industrial automation components. The system 100 includes resources 110-130 that represent lower-level control elements in an automation system. This can include input/output modules, devices such as pumps, valves, mixers, tanks, switches, network components, lower-level controllers and so forth. In general, such resources 110-130 operate at a lower system level that do not rely upon higher-end control systems or servers to arbitrate among the resources. In other words, the resources 110-130 arbitrate or allocate among themselves via arbitration components 140-160 that are associated with each of the resources. The arbitration components are able to exchange network data or signals 170 that indicate to each of the resources 110-130 which of the resources has been prioritized or allocated for the next available task. In this manner, each arbitration component employs the decision making ability to determine whether access to resource privileges is granted, denied, queued, or the like. For example, the resources 110-130 may include a set of pumps where each of the pumps could be a potential candidate for a control system process or operation. As a group, the pumps could employ the arbitration components 140-160 to determine among the group which pump from the set of pumps should be the next pump dynamically selected for the group.

As will be described in more detail below, a plurality of arbitration parameters can be considered and employed by the group to determine which among the set should be next in line for a respective process task. Such factors could include timing considerations (e.g., first available), priority considerations, economic considerations, maintenance considerations and so forth. A set of rules or policies can be followed where each of the resources 110-130 can determine if they are a potential candidate for a particular job. If so, messages can be sent between resources or I/O signals asserted at 170 indicating availability for a particular task. If more than one resource asserts for a task, further arbitration rules can be followed by the arbitration components 140-160 to determine which devices such as the pumps in this example should be prioritized as next in line for a task. Along with rules and policies for arbitration, advanced components such as learning components can be employed to monitor system usage over time and dynamically alter arbitration rules among the group.

Referring back to the example of pumps, a buffer may be passed around in one example indicating the order in which a resource was last used (see arbitration parameters below). If the policy were for the longest idle pump to be selected, the pump in the group that was longest removed from the last used state could be selected. Another parameter could be based upon a maintenance cycle. Thus, the pump or other device closest to being taken offline for maintenance could be assigned a lower priority. As can be appreciated, a plurality of parameters can be exchanged to determine which resource should be allocated for a particular task. In the case of more than one resource dynamically asserting itself for a task, further negotiations can occur to determine priority. For example, time stamp message can be passed across a network where each device can view real time clocks of the other devices or resources.

Depending on which device had the earliest stamp, such device could be declared the "leader" as far as being set as the next in line for a task. The prioritized leader could set a bit indicating it is next inline and pass the bit to indicate it has the greatest priority to execute a given task. In addition to network message, I/O data can be passed at 170 between resources 110-130 to indicate which device has the current priority. Also, sub-priority levels can be designated in case a primary resource cannot execute a task when called upon, a previously arbitrated resource can take its place to complete the respective task. In some cases, it clear-cut which resource should be assigned the greatest priority. For example, the policy for arbitration may be the first resource to request service. If one resource clearly indicates its availability before all others, then that resource can send a message or signal indicating it is the leader among prioritized resources. If ties or race conditions occur, further negotiations can occur until a resolution occurs between the resources 110-130. As will be described in more detail below, the arbitration parameters can be set in such a way as to resolve the resources 110-130 in some order of priority and without ambiguity.

In general, arbitration functionality is offloaded from higher-level controls to lower-level devices or resources 110-130 that have intelligence to arbitrate amongst the devices. Distributed processing can be utilized between the devices to determine a relative priority among a set of devices, where arbitration is sometimes referred to as resource allocation. Thus, in one aspect, resource allocation is distributed among resources 110-130 that are self-arbitrated between members of a group (e.g., deciding which device is available, determining relevant priorities between devices, selecting one or more devices for execution without having main controller involved in the device execution and distribution). Status between devices can be shared across a network or can be coupled via I/O signals at 170 to determine priorities.

Resources of the plant floor (e.g., equipment, pumps, valves, units, production lines) are enabled to be self-aware of their respective status for being in use or available for use. This allows the resources 110-130 to arbitrate between each other as opposed to having a central server or service administering ownership of equipment. By offloading resource allocation responsibilities from centralized controllers or servers, system performance can be enhanced while mitigating system costs. Other aspects include dynamic determination of arbitrated dependencies between resources that includes providing means for creating algorithms or strategies for deadlock avoidance. This may include diagnostics for sensing pending deadlocks and algorithmic actions for avoiding them. As noted previously, arbitration rules, policies, and arbitration parameters are analyzed by the arbitration components 140-160 to mitigate any type of conflict or lack of resolution between resources.

It is noted that components associated with the system 100 can include various computer or network components such as servers, clients, controllers, industrial controllers, programmable logic controllers (PLCs), batch controllers or servers, distributed control systems (DCS), communications modules, mobile computers, wireless components, control components and so forth that are capable of interacting across a network. Similarly, the term controller or PLC as used herein can include functionality that can be shared across multiple components, systems, or networks. For example, one or more controllers can communicate and cooperate with various network devices across the network. This can include substantially any type of control, communications module, computer, I/O device, sensors, Human Machine Interface (HMI) that communicate via the network that includes control, automation, or public networks. The controller can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware or software components). These include components such as switches with virtual local area network (VLAN) capability, LANs, WANs, proxies, gateways, routers, firewalls, virtual private network (VPN) devices, servers, clients, computers, configuration tools, monitoring tools, or other devices.

Figure 2:
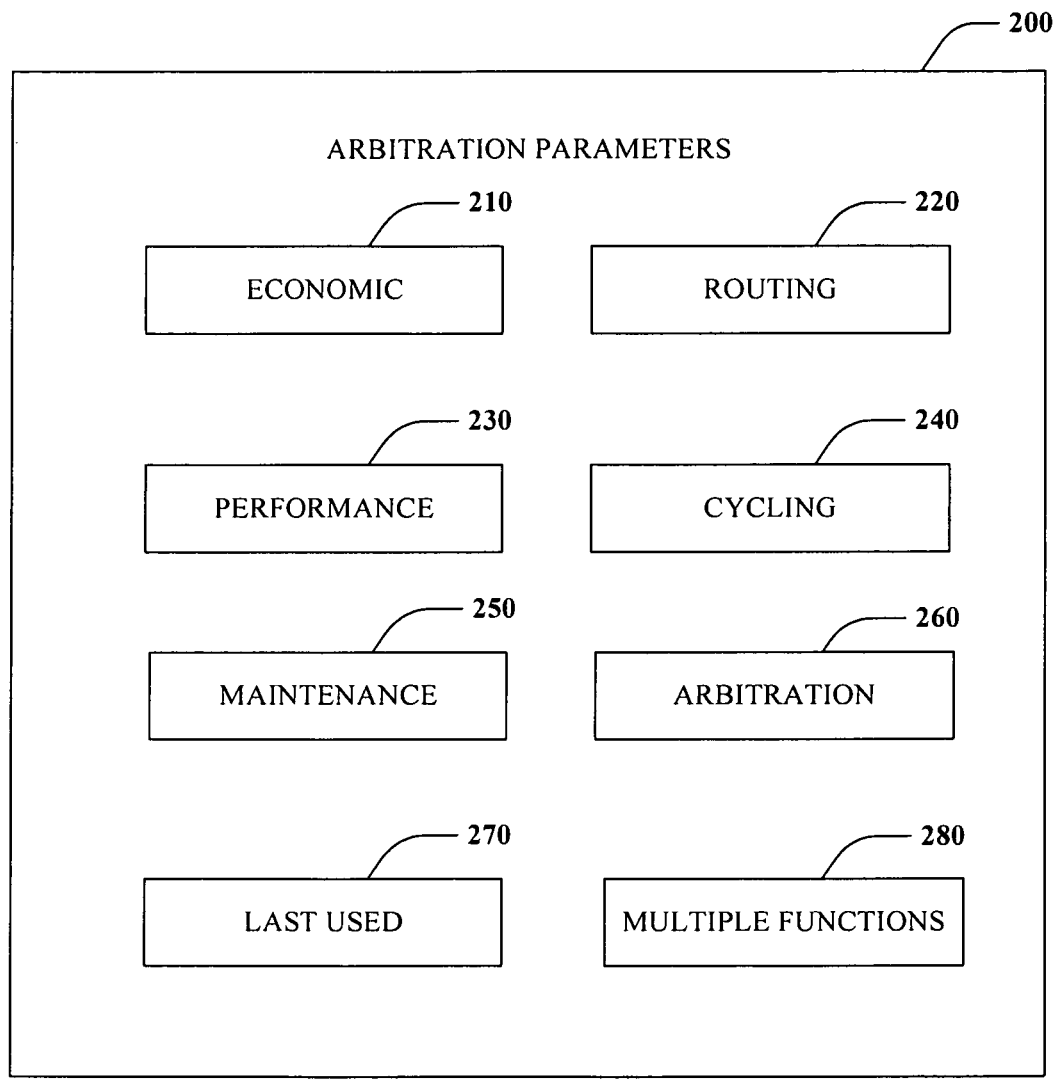
FIG. 2 is a diagram illustrating example arbitration parameters for selecting industrial control resources.

Turning now to FIG. 2, example arbitration parameters 200 are provided for selecting industrial control resources. In one aspect, economic attributes 210 may be considered by the arbitration components 140-160. These aspects define or characterize an economic quality about a given resource such as the cost to operate the resource or the amount of waste that may be generated when utilizing the resource. For example, if three mixers were available, and one operated at a higher efficiency and identified via a parameter associated with the mixer, if the attribute 200 specified use the highest efficiency mixer, then the arbitration components could delegate arbitration to the mixer available with the highest efficiency rating. At 220, routing attributes may be considered. Routing attributes 220 define characteristics about the inlet and outlet travels to a container or unit. For example, the distance traveled to receive or transport a material or specified by the time it might take to receive or transport a given material which implies which valve from a set of potential candidates is employed to input or output materials from a vessel. At 230, performance attributes processed. These can be substantially any type of attribute for specifying performance of a resource or the overall capabilities of the resource. For example, a set of motors operating pumps may be specified in horsepower or RPM's where the particular attribute specifies some aspect of the performance (e.g., select the motor with the highest RPM, select the motor that utilizes the most or the least amount of power, and so forth). In the case of self-arbitrated resources, parameters could be exchanged between resources where the resource that observed (among a group of exchanged parameters) that its parameter met the highest priority or arbitration criteria, could assert itself as the next available resource. As can be appreciated, arbitration criteria or parameters can be dynamically changed over time. For example, in one case a device may be selected for performance, yet after that selection, its last used state changes which may place it lower on an arbitration decision path the next time arbitration occurs among the group of devices.

Proceeding to 240, cycling parameters may be specified. Such parameters may be rotating parameters that float between resources to allow cycling of operation between the set. Thus, instead of always using the same pump, use a different pump on the next cycle in order to spread the load across a set of equipment. Thus, the next device inline to receive the cycling parameter may automatically be declared the highest priority to execute a given task. At 250, maintenance attributes can be considered. These attributes can be utilized to favor one subset of equipment over another to allow one or more resources to be properly maintained. This can include prioritizing a certain amount of downtime so that equipment can be properly serviced. Time stamps can be employed to indicate equipment usage or other criteria such as the number of on/off operations for example.

At 260, some parameters can be assigned by the resources or local control stations. For instance, resources that arbitrate amongst themselves to determine availability can assign a parameter indicating which resource has priority over another. Substantially any type of prioritizing code or tag can be employed to indicate that one piece of equipment has a priority for selection that is greater than another piece. In another case, a low-level controller can assign a priority over another local control station. At 270, a last used parameter can be specified. This type of attribute may indicate some quality about an inlet or exit feed for instance that may prioritize it for subsequent operations. For instance, if a pipe exit feed is coated with some material from a previous drain operation, the coating on that respective pipe may not be suitable for a subsequent fill operation to another vessel unless the pipe itself is first cleaned. Thus, the resource controlling access to that pipe may be assigned a lower priority (e.g., rule that assigns lower priority based on last state or use). At 280, multiple function considerations can be defined as parameters of priority. For example, one pump may be able to both draw a new material from one source while generating a voltage for another portion of a process. One type of parameter may specify a higher priority to multi-function equipment as opposed to resources having less functionality. As can be appreciated, substantially any type of tag or qualifier that can be assigned to a resource can be employed as an arbitration parameter 200 to distinguish a subset of resources among a set of resources. Although not shown, other parameters and rules can be employed for arbitration of resources. For example, a first available parameter could be exchanged between resources where the parameter is a time indicator or counter indicating one devices priority over another. In the case of ties, a smaller subset of devices can negotiate between themselves based on rankings given to the arbitration parameters 200. Values can be selected for such rankings that facilitate an eventual leader among devices will be assigned the highest priority.

Figure 3:
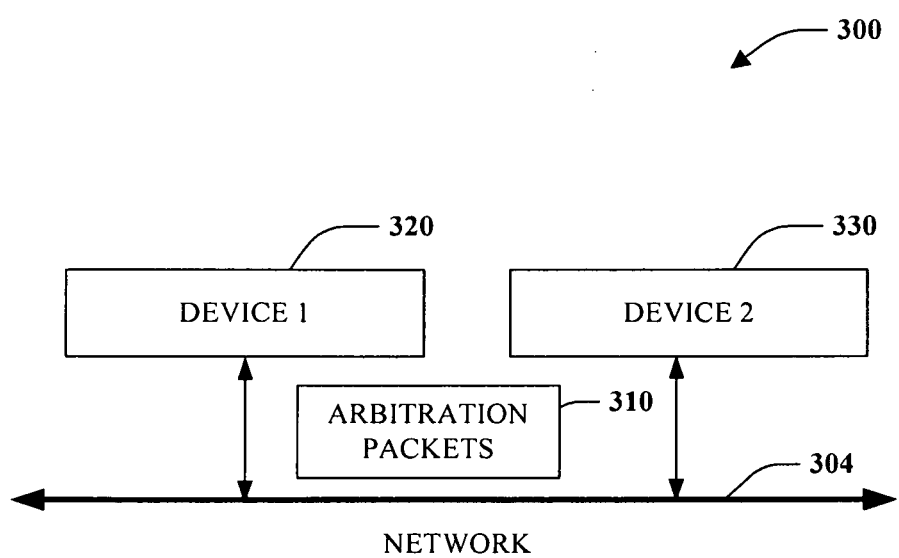
FIG. 3 is a diagram illustrating network exchanges for resolving arbitration conflicts between resources.

FIG. 3 is a system 300 that illustrates network exchanges for resolving arbitration conflicts between resources. In this aspect, a network 304 is employed to exchange arbitration data 310 between network resources or devices 320 and 330. Although only two devices 320 and 330 are shown, it is to be appreciated that a plurality of such devices could arbitrate over the network 304. Various mechanisms can be employed for exchanging and synchronizing data over the network. In some cases, message packets or single bits of data can be employed as the arbitration packet 310. For instance, a table of data could be exchanged where each device reports its respective status and arbitration parameters. The device with the highest ranked status after all (or most) devices have reported, can declare itself the leader for the next operation of a process. After declaring itself the leader, a device can send packets 310 to alert other devices of its intention to be the next available resource. Network nuances can be employed to facilitate that devices have correctly reported and the timing relationship between packets. For instance, in a Control or Device network, data is transmitted according to a network clock. Data can be synchronized according to the clock where each device can be reasonably assured that it is reading the most current status from the other devices on the network 304. If any uncertainty is encountered or more than one device asserts ownership, the network 304 can be employed to negotiate further among the devices. Such negotiation can include arbitration algorithms that weigh each device's current priorities based on parameters, where a priority can be determined from the accumulated scores or weights assigned by the parameters. For instance, even though two devices may consider themselves of equal priority, a last used parameter may indicate that one device was more recently used thus breaking the tie with one or more other devices (e.g., the device that was most recently used could be given a lower priority score).

Figure 4:
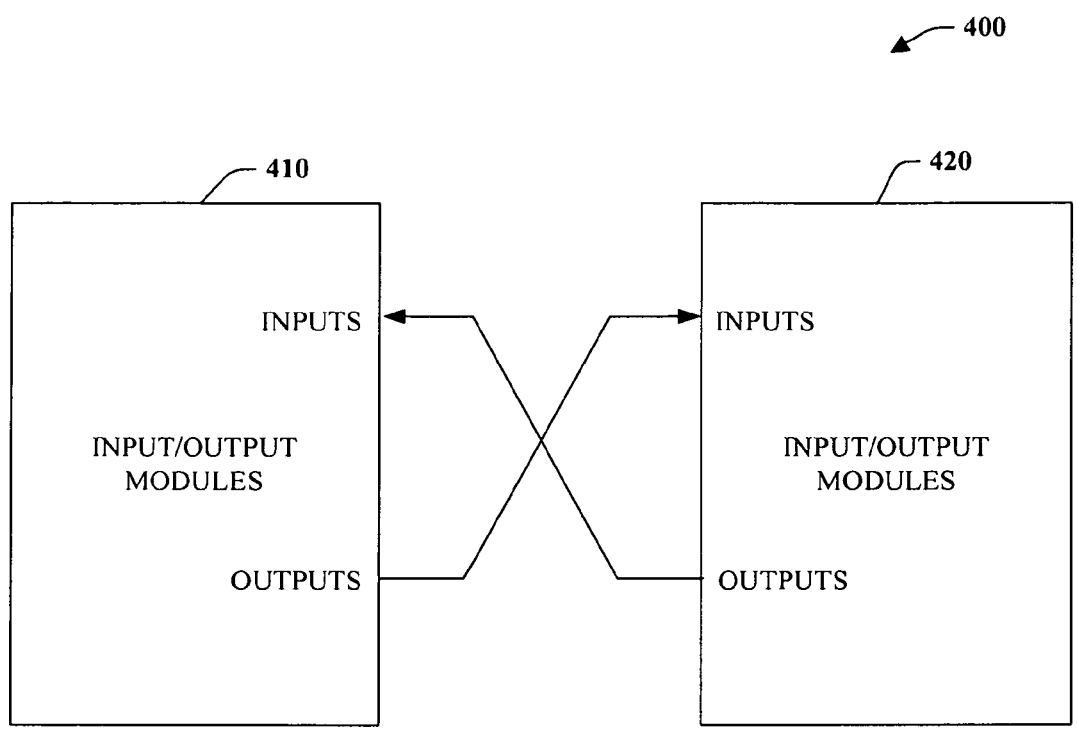
FIG. 4 is a diagram illustrating Input/Output exchanges for resolving arbitration conflicts between resources.

FIG. 4 is a system 400 illustrating Input/Output exchanges for resolving arbitration conflicts between resources. Similar to network data exchanges described above with respect to FIG. 3, the system 400 shows I/O data exchanges between modules or devices. Similar to above, I/O can be communicated between more than the two example modules 410 and 420 that are shown. As illustrated, output from module 410 is coupled to input port 420 and output from module 420 is couple to input port 430. Such signals can be used to alert one module that another has taken priority over another. For example, a simple rule may be that the first module to request priority is given the highest priority. If it cannot be determined which module has asserted its output first, the network packets described above can also be passed to further help resolution of priority between modules. Also, if multiple modules assert priority in a concurrent manner, modules can assert and reassert I/O signals to identify a code regarding some parameter or attribute detected by a given module. For example, if a module asserts and de-asserts an output signal three times, this indicates that the module was last used three batch processes ago. If only one module asserts priority, it can claim priority and set an output indicating that it is the leader among a group of competing modules, devices, or other resources. As can be appreciated, sophisticated arbitration algorithms can be provided with each module to resolve subtle disputes, where policies and parameters are weighed in view of other mechanisms such as real time clocks to determine respective priorities.

Figure 5:
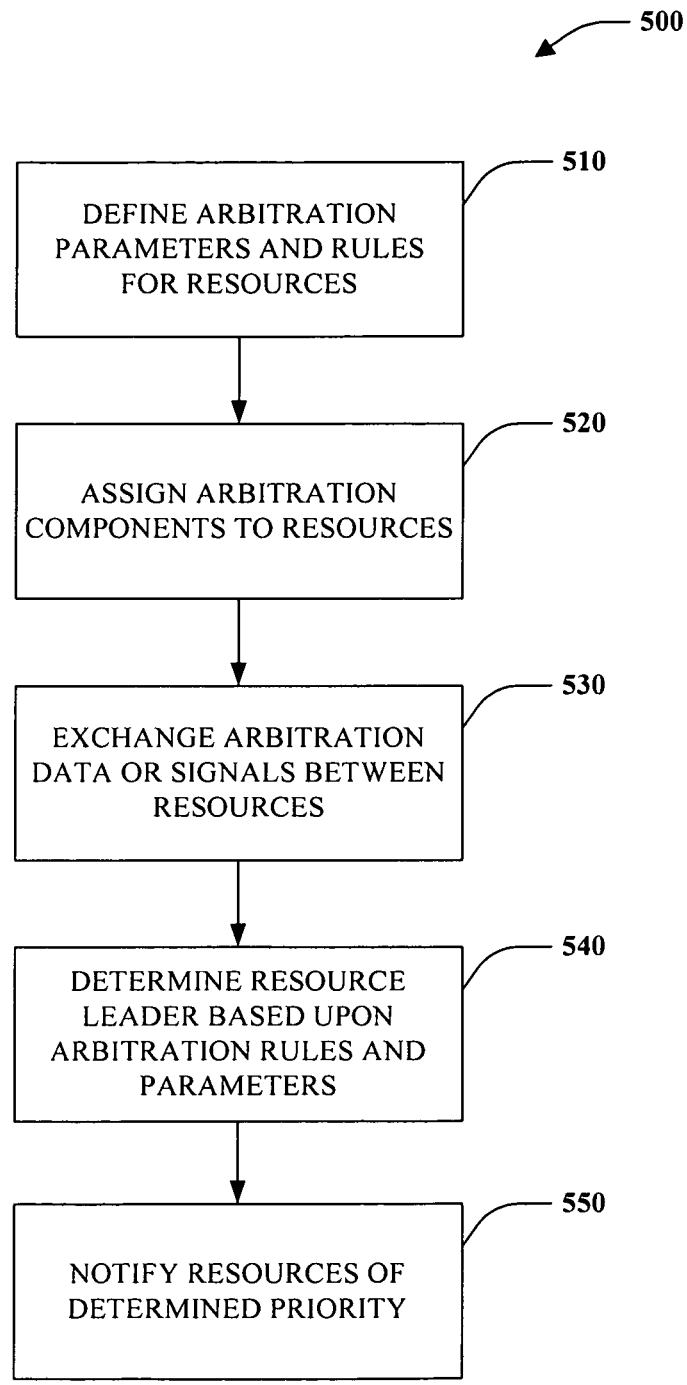
FIG. 5 is a flow diagram illustrating a method for selecting resources between a set of self-arbitrating resources.

FIG. 5 is a flow diagram illustrating a method 500 for selecting resources between a set of self-arbitrating resources. While, for purposes of simplicity of explanation, the methodology is shown and described as a series of acts, it is to be understood and appreciated that the methodologies are not limited by the order of acts, as some acts may occur in different orders or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Proceeding to 510, arbitration parameters and rules are defined. Such components of arbitration can be located with each resource such that the resource can determine whether it possesses higher priority than some other resource that also may be bidding to perform some operation or function. As noted previously, some example parameters include maintenance parameters, timing parameters, state parameters, cycling parameters, routing parameters, and so forth. At 520, arbitration components are assigned to individual resources. These can include software or hardware components that utilize rules, policies, or parameters to determine resource allocation and priority among a set of competing resources or modules. At 530, arbitration data or signals are exchanged between two or more modules, where the data is employed to determine which resource has the highest priority. For example, a table of time stamps can be compared to see which module among a set was the first to assert. If two modules time-stamped at the same time, further negotiations could occur. For example, a comparison of scoring functions that is some statistical derivation of weights assigned to various detected parameters. At 540, a resource leader is determined from the data exchanged at 530. This can include exchange of a few bits to more elaborate exchanges of network messages, where such data is analyzed according to rules and policies installed on each module to declare a leader from a group of resources. At 550, when one module determines it is the leader or highest priority from the analyzed data that has been exchanged between modules, network messages or signal data can be sent out to the other modules to notify than an arbitration cycle is complete.

Figure 6:
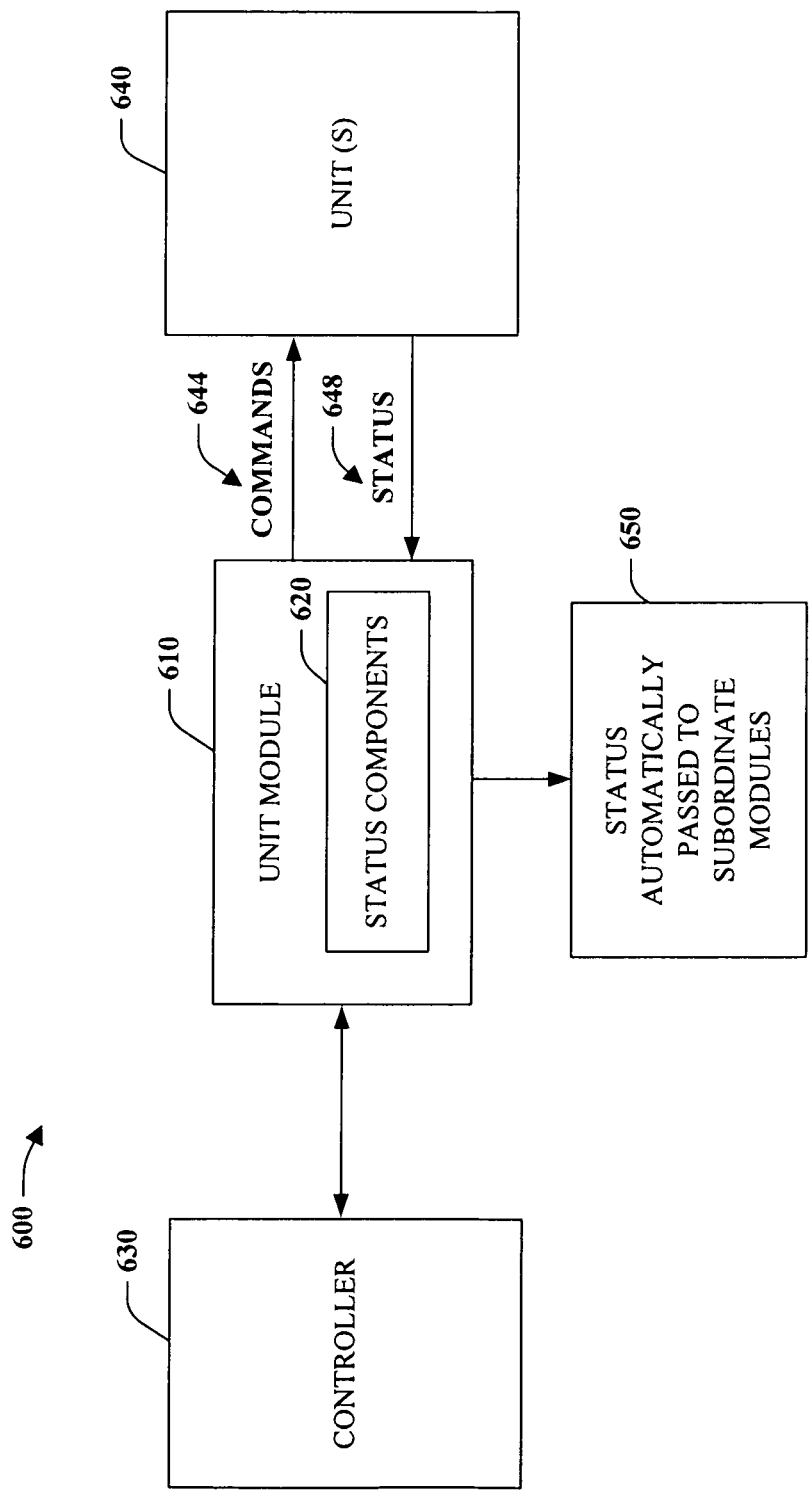
FIG. 6 is a schematic block diagram illustrating a unit module and status components for an industrial automation system.

Referring initially to FIG. 6, a system 600 illustrates a unit module 610 and status components 620 arbitrating among resources in an industrial automation environment. A controller 630 such as a batch server or programmable controller operates (or communicates with) the unit module 610, where one or more units 640 respond to commands 644 and provide present status to the unit module. In contrast to prior systems, the status components 620 in the unit module 610 receive and process the status 648 according to the current conditions of the unit 640 as opposed to inferred or other type conditions. For instance, the unit 640 could be a vessel being cleaned before a next phase of a batch is initiated. The fact that the unit 640 is being cleaned by another procedure is captured by the status components 620 to indicate to the unit module 610 that the unit 640 is in use and thus unavailable at the present time. As shown, status can be automatically passed to subordinate modules 650. As can be appreciated, a hierarchy of modules can be communicated with via the unit module 610. Thus, along with subordinate modules 650 being apprised of present status, modules above the unit module in a hierarchy (not shown) can also receive the respective status.

State evaluation components 620 are provided with functional control modules such as the unit module 610 but other modules can also receive and process such status 648. The state evaluation provides present state conditions as opposed to inferred status. By adding such capability to the unit module 610 (or other module), code design during installation is mitigated since code does not have to be developed to determine or infer the correct status. In one example, the unit module 610 provides resident control for the unit 640 where processing activities (e.g., mix a batch, perform discrete operation) can be performed. The unit 640 can include vessels, tanks, work areas, or assembly points where a process is performed or discrete operation commences. The unit module 610 can include advanced functionality for reliable equipment control that includes the ability to generate and process present state information such as quality, availability, priority, cleanliness and so forth which will be described in more detail below. In addition, a parent child relationship can be created with other subordinate equipment centric objects or modules at 650 (Control Modules, Equipment Modules), which provides increased communications functionality to the subordinate modules.

Before proceeding, some example features of the unit module 610 and status components 650 are now described. In one aspect, the unit module 610 provides Availability Status which can include such states as: Available; Producing; Held; Out of Service; and so forth. The unit module 610 is also capable of accepting requests from users and external logic to change the availability status. In another aspect, Cleanliness Status can include such status as: Not Clean; Cleaning in Process, Rinsed; Cleaned; Sanitized, Sterilized and so forth. This also includes the ability of accepting requests from users and external logic to change the cleanliness status. In other examples, the unit module 610 provides process status such as Empty; Filling; Processing; Emptying; and so forth. The unit module 610 can also provide status information to other modules in a hierarchy of modules as noted above. This status information can be persistent and include: Alarm status; Availability Status; Arbitration Status, Cleanliness Status; Process Status; Quality Status; Campaign Status; or other status as desired. Such status can be employed to determine priority among modules or other resources.

As will be described in more detail below, the unit module 610 can be an association of logic with one or more resources. The logic includes program code that can alter the state of a resource for example, ladder code, function chart, script, JAVA, C code, and so forth. The resources are those components or elements that perform an activity in a system including equipment and personnel that perform work in a system. Other examples of types of resources include Equipment, Material, Personnel, Segments and Storage. Personnel and equipment (machines) can perform activities in a system. Resources that can perform work can be classified as active resources (e.g., CNC machine, Injection molding machine), whereas other equipment resources can be considered passive resources (e.g., sensor, material). In general, the modules hide the user from internal interfaces, messages, and logic specific to the resources yet provide standard or generic interfaces to external systems or between components.

Figure 7:
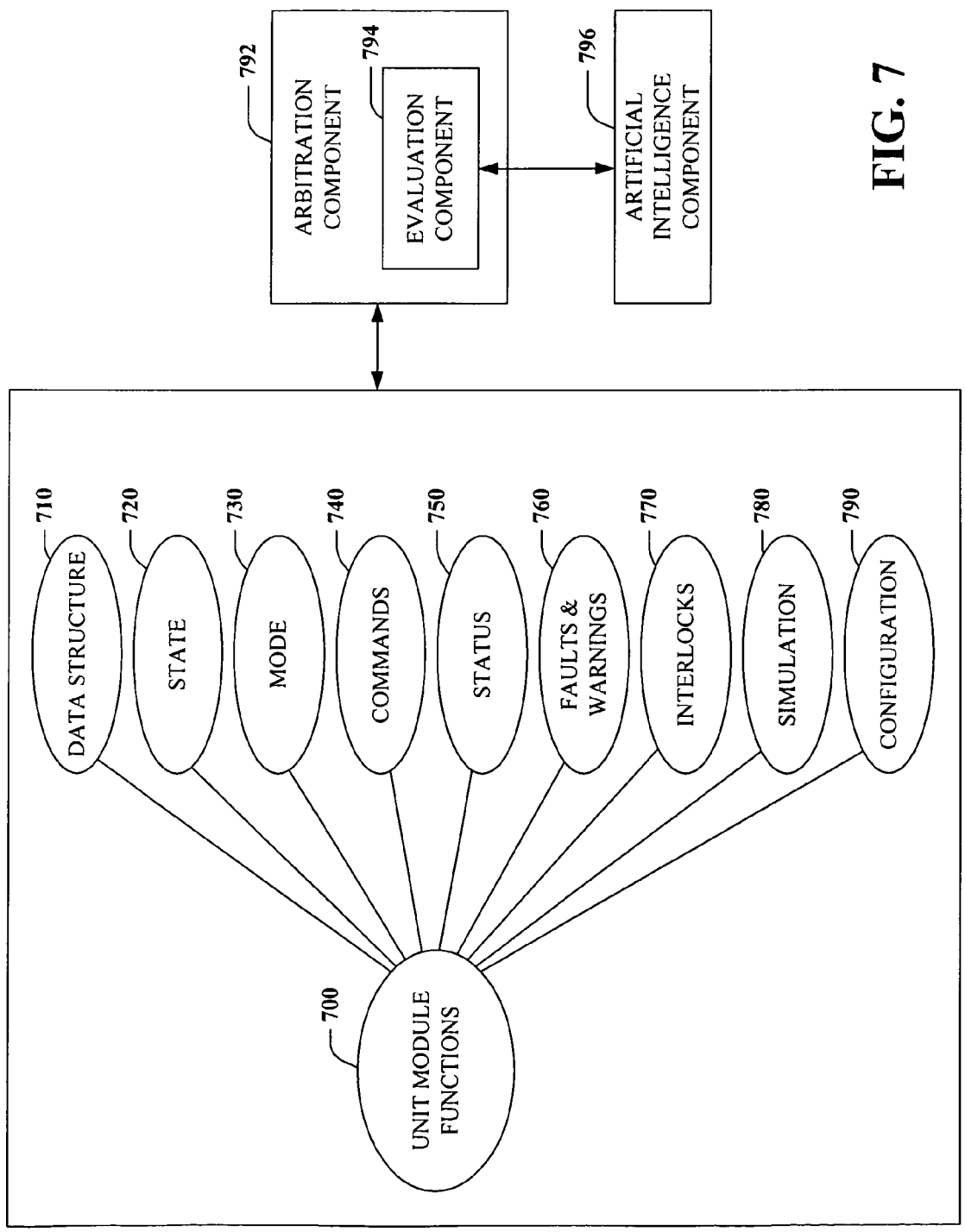
FIG. 7 illustrates example module functions for evaluation self arbitrating resources.

Referring now to FIG. 7, example unit module functions 700 are illustrated. At 710, a module Data Structure can be provided. The unit module can be structured in a manner that allow components to easily find and understand information issued to and produced by the respective module. For example, simulation parameters can be grouped in a common section, status is given in a separate section, and configuration parameters are grouped together as well. Another unit module function 700 includes state processing 720. Thus, the unit module can perform as a state machine for a particular grouping of equipment modules. The actual states can be defined during implementation. The states 720 may be initiated by a procedure or operator, but the unit states do not have to follow the S88 state model although S88 states can be employed.

At 730, mode processing can be provided. Generally, the unit module functions via the control system in auto, semi-auto or manual mode. While in auto mode, the respective unit is under the control of the automation system. All direct control requests from the operator will generally be ignored. While in semi-auto mode, the unit may receive requests from an operator at the equipment phase or the equipment module level, for example. While in manual mode the unit may receive requests from an operator at the control module level, for example. Proceeding to 740, one or more commands can be provided. Typically, the unit module is commanded to a state or mode by automation commands or the operator. The unit module has the ability to transfer these states or modes to its associated Equipment Phases and Modules.

At 750, module status can be processed. As noted above, the unit module provides a set of predefined status values. A project specific area can also be created to allow the user to add additional status information. This status describes the unit, which may be a vessel or machine. Status information can be grouped into the following example categories: Alarm; Availability; Cleanliness; Process; Quality; Campaign; and so forth. At 760, fault and warning data can be provided by the unit module. For instance, the unit module can monitor fault conditions and generate suitable fault status when a failure occurs. At 770, interlocks can be provided. If the process or safety interlocks are lost, the unit module can be de-energized. A process interlock bypass configuration can be provided to circumvent process interlocks for a device. At 780, the unit module can be placed in a simulation mode. Simulation can also be achieved indirectly within subordinate Control Modules. At 790, configuration includes modifying a unit module's configuration data, where the behavior of a particular module instance can be modified. When module configurations are considered valid, an individual of appropriate authorization level may save the current settings. If the unit module's configuration settings deviate from the saved setting, an indication can appear on the HMI faceplate or electronic message for example. An authorized individual can then save the current configurations or restore the previously saved configuration. In providing configurable attributes, a single Unit module class may be adapted to a number of diverse vessel or machine instances.

Figure 8:
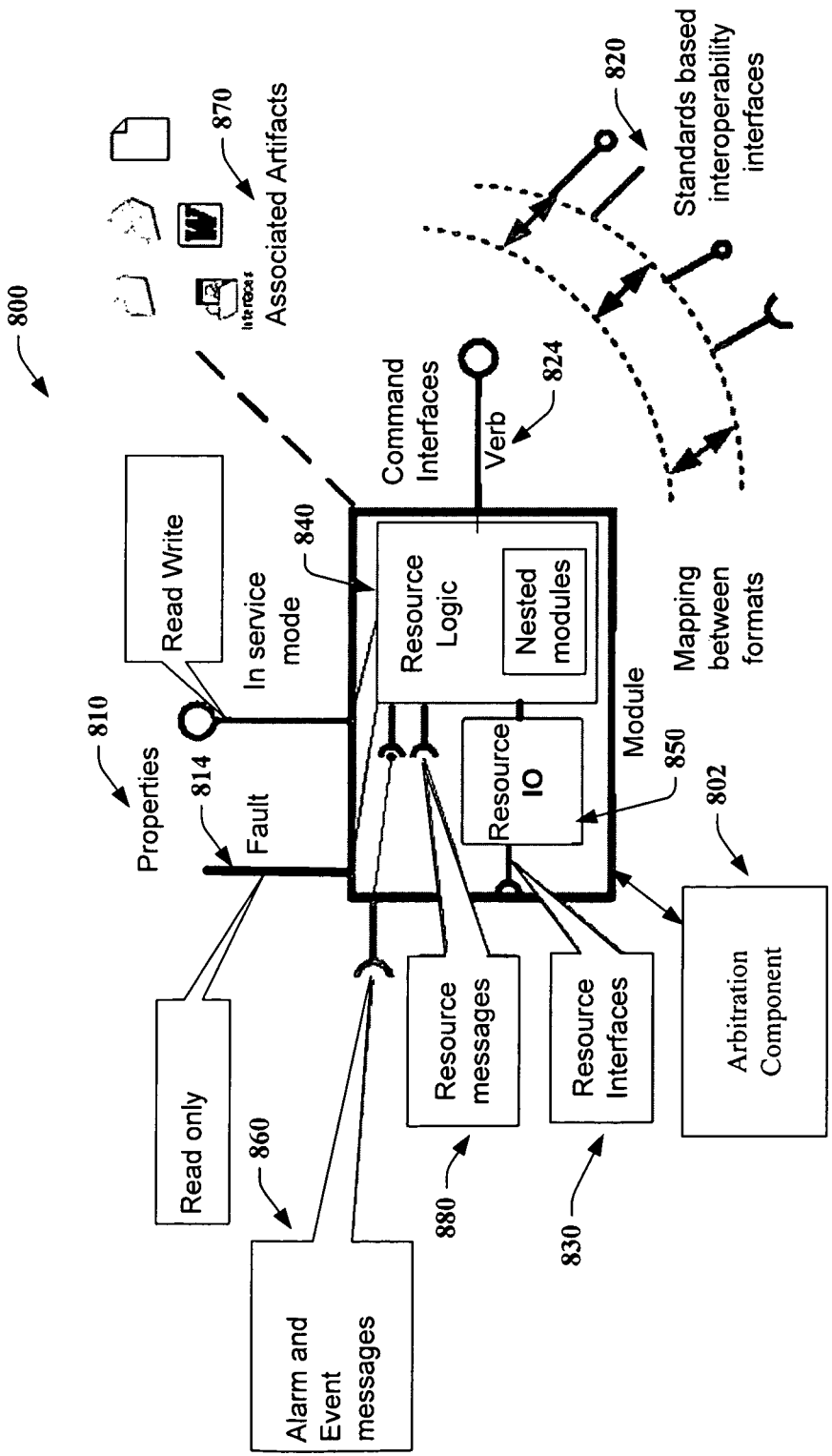
FIG. 8 is a diagram illustrating module interfaces and attributes for self arbitrating resources.

An arbitration components 792, utilize an evaluation component 794 to analyze, interpret, and synthesize the unit module functions 700 for purposes of making decisions related to granting, queuing, or denying privileges to the resource. The suggestion can be made through implementation of at least one artificial intelligence technique, through use of a rule set (e.g., suggest a decision based anticipated or historical performance). An artificial intelligence component 796 can be employed in performance of various determinations and/or inferences. It is to be appreciated that artificial intelligence techniques can be used to practice determinations and inferences disclosed in the subject specification. The artificial intelligence component 796 can employ one of numerous methodologies for learning from data and then drawing inferences and/or making determinations related to granting, queuing, or denying privileges to the resource. The artificial intelligence component 796 can also include methods for capture of unit module function 700 relationships such as theorem provers or more heuristic rule-based expert systems. The artificial intelligence component 796 can be represented as an externally pluggable component, in some cases designed by a disparate (third) party Referring now to FIG. 8, module attributes 800 are illustrated that can be employed in conjunction with an arbitration component 802. The attributes 800 depicted in FIG. 8 include a common (or exemplary) representation that can be modules built from other modules. Generally, a set of standard attributes can be determined that are common to all modules. Similarly, for other types of modules described below, additional standard attributes can be defined. An example of a property 810 available on modules includes attributes such as arbitration diagnostics, fault and status at 814. Active resource modules (e.g., equipment and personnel) can support additional properties 810 such as available/unavailable.

Attributes presented below are represented associations from the module to objects which may be internal in a common data model or elsewhere (e.g., CAD Files). At 820, standard public interfaces can be provided. These interfaces 820 publish verbs 824 that are available to external systems and are documented activities that hide the complexity of the underlying code used to implement the interface. Interfaces 820 provide the mechanisms to expose the functions of the arbitration component 802 to external systems and applications. Additionally, interfaces 820 can be used as access points that can be used to hook in real time arbitration diagnostics, security and so forth.

Public verbs 824 initiate an action within the module. The activity is described to clients of the interface 820. The implementation is considered private and is not presented to clients—for example, Grant, Queue, Deny, and so forth. A data value property 810 provides public access to information that is used by the module during its operation and can be provided by request values and/or internal values (or an equivalent). The association of logic to transfer request values to internal values and vice versa are referred to as get and set logic for the value. It is noted that in a controller, if there is not a set routine to transfer request values to internal values, the internal value can overwrite the request value on the next scan providing read only capability.

In general, the properties 810 can be considered in at least two classifications. States have special significance for production systems and can have a specific set of values that can be represented by range or enumeration. A state can represent the current status of the primary resource being encapsulated by the module e.g., Percent open, Mode, Service (in, out), and so forth. Information that is used by the module during its operation includes access to data that is provided by interfaces 820. e.g., Conversion Map, Name, Description, expiry date, personnel contact information. Some properties 810 can be common to all instances of resource modules (e.g., scanned copy of resource specification documents), whereas other properties 710 are specific to each module instance (e.g., Status, percent open).

At 830, internal resource interfaces include interfaces from logic 840 in the module to the resource being managed at 850, where the logic includes code and/or configuration that processes a command and/or updates state and data properties. In some cases, this can be hardware such as I/O interfaces, or in other cases it is to subordinate resource control modules that have direct interfaces. Some examples include I/O mapping, material management logic routines, and so forth. These interfaces 830 are internal to the module enabling the modules public interfaces 820 and properties 810 to be the boundary to other system components. Modules that wrap different resources but support the same public properties/interfaces can be exchanged without disrupting interfaces to other components. Generally, I/O mapping and system messaging interfaces are exposed during deployment bind processes. When bound, external interfaces 820 to runtime systems may then consider these interfaces as internal.

At 860, alarm and event messages can be provided which include messages that exposed as runtime messages visible to external systems during the execution of the module. This includes alarms and events explicitly coded by the developer and system messages promoted to be visible by external systems. At 870, one or more artifacts include information that document the operation and structure of the resource such as for example, wiring diagrams, warranties, payroll, parts supplier information, and so forth. Visualization aspects include associated graphics that present the resource state and properties to applications interacting with the resource. For example: faceplates, icons, state overlays, edit dialogs, help files. At 880, system messages allow modules to listen for and publish data model messages to external components. Inbound messages are typically used to manage modules (configure, initialize, propagate properties, and so forth) and publish messages on module activity (resource state, data model messages, and so forth).

Figure 9:
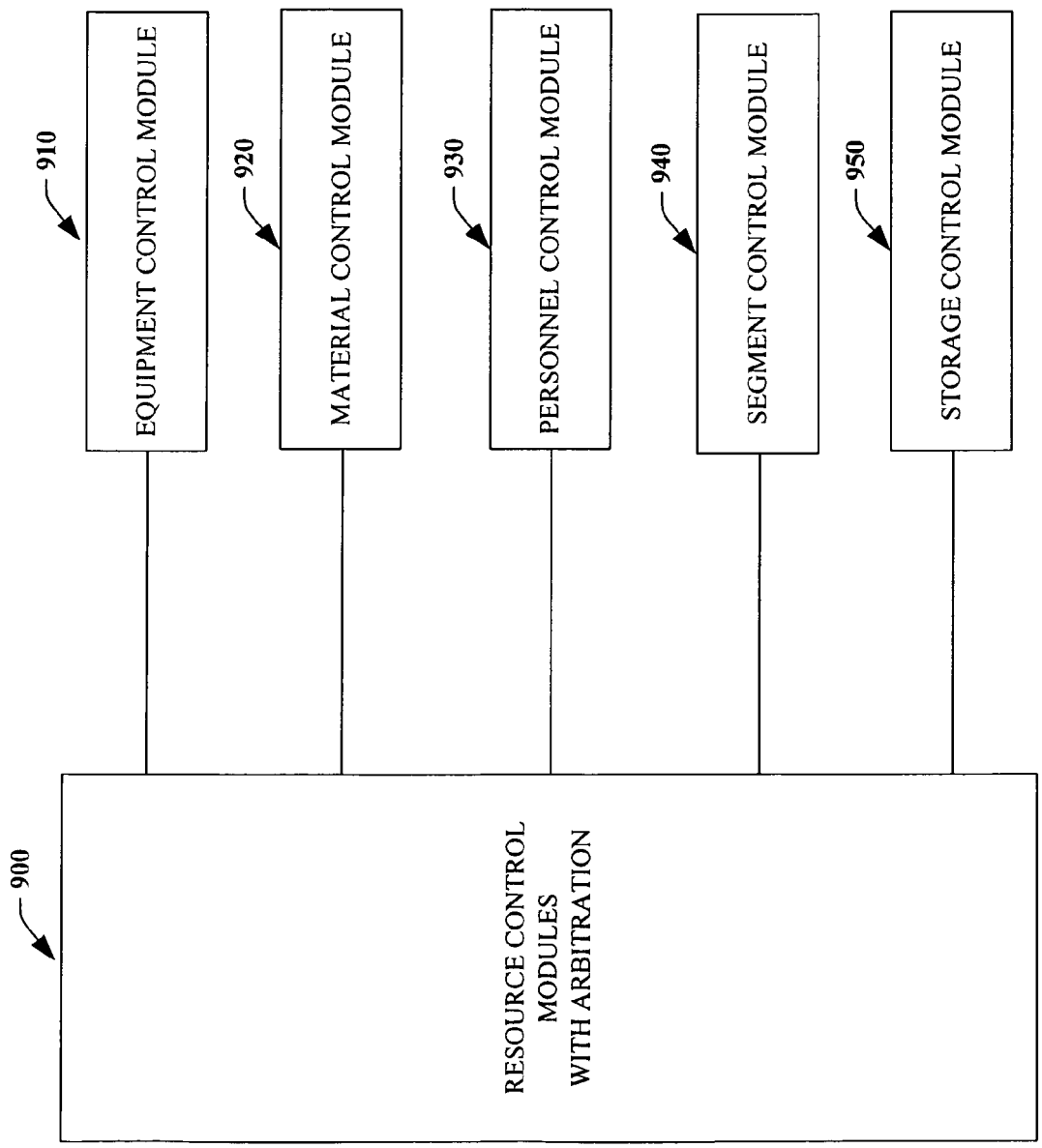
FIG. 9 is a diagram illustrating example resource control modules for self arbitrating resources.

Turning to FIG. 9, example resource control modules 900 including arbitration components are illustrated.

In general, resource control modules 900 provide simple control of one or more resources. The resource control module (RCM) 900 represents the logic to manage the state or data of the resource and may contain other resource control modules to achieve its respective functionality. The RCM 900 provides public interfaces via actions and properties. In some cases, an action may be a simple bit value or a request value that is interfaced to internal values in the module and in other cases more complex logic can be provided. The RCM 900 can include other resource control modules and may promote a command to be represented as segment resource control interface. Example forms of the RCM 900 include:

At 910, an Equipment Control Module (Common name="Control Module") CM. The simplest form of basic regulatory control of equipment. Encapsulating the equipment and its control such as control of values, drives, and so forth. At 920, a Material Control Module (MCM) can be provided. Management of Material resource instances which are represented as sub-lots including change in location, quality status, availability, order status, logic that can be performed on material sub-lots, generation of material events such as consumed, produced and moved events, sub-lot combination, expiry dates, and so forth.

At 930, a Personnel Control Module (PCM) is provided. This includes management of individual people such as Active, Idle, Break states directly or via shift schedules. This also includes data associated with people such as shift time patterns, for example. Other attributes that may be managed by PCM 930 are a person's location in a plant (GPS), qualification checks, or current assignment, for example. At 940, a Segment Control Module (SCM) includes manipulation of simple segment tasks such as piping paths, AGV paths, device state machines, robotic sequences and so forth. The SCM 940 typically performs an action on one segment such as next step to execute after the current step. At 950, a Storage Control Module (STGCM) includes Manipulation of simple storage logic such as buffer capacity and ordering into and out of a queue for the respective storage unit or requirement.

The subject matter as described above includes various exemplary aspects. However, it should be appreciated that it is not possible to describe every conceivable component or methodology for purposes of describing these aspects. One of ordinary skill in the art may recognize that further combinations or permutations may be possible. Various methodologies or architectures may be employed to implement the subject invention, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial control system, comprising:
an industrial automation resource device, including a microprocessor, enabled to perform a manufacturing task and configured to:
exchange arbitration parameters with at least one other industrial automation resource device enabled to perform the manufacturing task, wherein the arbitration parameters comprise a last used attribute that describes at least one of first material coating an inlet of the industrial automation resource device from a previous manufacturing task or a second material coating an outlet of the industrial automation resource device from the previous manufacturing task;
determine whether the industrial automation resource device or the at least one other industrial automation resource device is to be employed to perform the manufacturing task based upon the exchanged arbitration parameters and a set of arbitration rules;
in response to a determination that the industrial automation resource device is to be employed to perform the manufacturing task, send assertion information to the at least one other industrial automation resource device indicating that the industrial automation resource device is to be employed to perform the manufacturing task.

2. The system of claim 1, wherein the industrial automation resource device is further configured to:
in response to sending the assertion information to the at least one other industrial automation resource device and receiving other assertion information from the at least one other industrial automation resource device indicating that the at least one other industrial automation resource device is to be employed to perform the manufacturing task, negotiate with the at least one other industrial automation resource device to determine whether the industrial automation resource device or the at least one other industrial automation resource device is to be employed to perform the manufacturing task.

3. The system of claim 1, wherein the industrial automation resource device further comprises a learning component configured to negotiate with at least one other learning component of the at least one other industrial automation resource device to adjust the set of arbitration rules based upon exchanged arbitration parameters and assertion information.

4. The system of claim 1, wherein the arbitration parameters further comprise a routing attribute that describe a characteristic of at least one of material travel from a source to an inlet of the industrial automation resource device or from an outlet of the industrial automation resource device to a destination.

5. The system of claim 4, wherein the characteristic is a distance.

6. The system of claim 4, wherein the characteristic is amount of time.

7. The system of claim 1, wherein the arbitration parameters further comprise an economic attribute that describes an amount of waste that will be generated if the industrial automation resource device is employed to perform the manufacturing task.

8. A method, comprising:
sending, by an industrial automation resource device including a processor enabled to perform a manufacturing operation, first arbitration parameters to at least one other industrial automation resource device enabled to perform the manufacturing operation;
receiving, by the industrial automation resource device, second arbitration parameters from the at least one other industrial automation resource device, wherein the first and second arbitration parameters comprise a last used attribute that describes at least one of first material coating an inlet of the industrial automation resource device from a previous manufacturing operation or a second material coating an outlet of the industrial automation resource device from the previous manufacturing operation;
comparing, by the industrial automation resource device, the first arbitration parameters with the second arbitration parameters; and
determining, by the industrial automation resource device, whether the industrial automation resource device or the at least one other industrial automation resource device is to be employed to perform the manufacturing operation based upon the first arbitration parameters, second arbitration parameters, and a set of arbitration rules;
in response to a determination that the industrial automation resource device is to be employed to perform the manufacturing operation, sending, by the industrial automation resource device, first assertion information to the at least one other industrial automation resource device indicating that the industrial automation resource device is to be employed to perform the manufacturing operation.

9. The method of claim 8, further comprising, in response to sending the first assertion information to the at least one other industrial automation resource device and receiving second assertion information from the at least one other industrial automation resource device indicating that the at least one other industrial automation resource device is to be employed to perform the manufacturing operation, negotiating, by the industrial automation resource device, with the at least one other industrial automation resource device to determine whether the industrial automation resource device or the at least one other industrial automation resource device is to be employed to perform the manufacturing operation.

10. The method of claim 8, further comprising negotiating, by the industrial automation resource device, with the at least one other industrial automation resource device to adjust the set of arbitration rules based upon exchanged arbitration parameters and assertion information.

11. The method of claim 8, wherein the arbitration parameters further comprise a routing attribute that describes a characteristic of at least one of material travel from a source to an inlet of the industrial automation resource device or from an outlet of the industrial automation resource device to a destination.

12. A non-transitory computer-readable medium having instructions stored thereon that, in response to execution, cause an industrial automation resource device including a processor to perform operations comprising:
wherein the industrial automation resource device is enabled to perform a manufacturing function;
sending first arbitration parameters to at least one other industrial automation resource device enabled to perform the manufacturing function, wherein the arbitration parameters comprise a last used attribute that describes at least one of first material coating an inlet of the industrial automation resource device from a previous manufacturing function or a second material coating an outlet of the industrial automation resource device from the previous manufacturing function;
receiving second arbitration parameters from the at least one other industrial automation resource device;

comparing the first arbitration parameters with the second arbitration parameters; and determining whether the industrial automation resource device or the at least one other industrial automation resource device is to be employed to perform the manufacturing function based upon the first arbitration parameters, second arbitration parameters, and a set of arbitration rules;

in response to a determination that the industrial automation resource device is to be employed to perform the manufacturing function, sending first assertion information to the at least one other industrial automation resource device indicating that the industrial automation resource device is to be employed to perform the manufacturing function.

13. The non-transitory computer-readable medium of claim 12, the operations further comprising, in response to sending the first assertion information to the at least one other industrial automation resource device and receiving second assertion information from the at least one other industrial automation resource device indicating that the at least one other industrial automation resource device is to be employed to perform the manufacturing function, negotiating with the at least one other industrial automation resource device to determine whether the industrial automation resource device or the at least one other industrial automation resource device is to be employed to perform the manufacturing function.

14. The non-transitory computer-readable medium of claim 12, the operations further comprising negotiating with the at least one other industrial automation resource device to adjust the set of arbitration rules based upon exchanged arbitration parameters and assertion information.

15. The non-transitory computer-readable medium of claim 12, wherein the arbitration parameters further comprise a routing attribute that describe characteristics of at least one of material travel from a source to an inlet of the industrial automation resource device or from an outlet of the industrial automation resource device to a destination.

16. The non-transitory computer-readable medium of claim 12, wherein the arbitration parameters further comprise an economic attribute that describes an amount of waste that will be generated if the industrial automation resource device is employed to perform the manufacturing function.

17. The method of claim 11, wherein the characteristic is a distance.

18. The method of claim 11, wherein the characteristic is amount of time.

19. The method of claim 8, wherein the first and second arbitration parameters further comprise an economic attribute that describes an amount of waste that will be generated if the industrial automation resource device is employed to perform the manufacturing operation.

* * * * *